United States Patent
Sakagami et al.

(10) Patent No.: US 9,071,761 B2
(45) Date of Patent: *Jun. 30, 2015

(54) INFORMATION PROCESSING APPARATUS, INFORMATION PROCESSING METHOD, PROGRAM, AND IMAGING APPARATUS INCLUDING OPTICAL MICROSCOPE

(71) Applicant: Sony Corporation, Tokyo (JP)

(72) Inventors: Junichi Sakagami, Tokyo (JP); Nobuhiro Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 94 days.

This patent is subject to a terminal disclaimer.

(21) Appl. No.: 13/868,814

(22) Filed: Apr. 23, 2013

(65) Prior Publication Data

US 2013/0235181 A1    Sep. 12, 2013

Related U.S. Application Data

(63) Continuation of application No. 12/961,023, filed on Dec. 6, 2010, now Pat. No. 8,442,347.

(30) Foreign Application Priority Data

Dec. 14, 2009   (JP) .................................. 2009-283342

(51) Int. Cl.
| | |
|---|---|
| G06K 9/40 | (2006.01) |
| H04N 5/235 | (2006.01) |
| G02B 21/36 | (2006.01) |
| G06T 5/00 | (2006.01) |
| G06T 5/50 | (2006.01) |
| H04N 5/335 | (2011.01) |
| H04N 5/357 | (2011.01) |

(52) U.S. Cl.
CPC ............ *H04N 5/2351* (2013.01); *G02B 21/365* (2013.01); *G06T 5/008* (2013.01); *G06T 5/50* (2013.01); *G06T 2207/10056* (2013.01); *H04N 5/335* (2013.01); *H04N 5/3572* (2013.01)

(58) Field of Classification Search
CPC .. G02B 21/16; G02B 21/0004; G02B 21/365; G06T 2207/10056; H04N 5/2351

USPC .......... 382/254, 274, 275, 305, 312; 345/426, 345/589; 348/79, 80; 358/518–522; 250/311

See application file for complete search history.

(56) References Cited

U.S. PATENT DOCUMENTS

| | | | | |
|---|---|---|---|---|
| 6,924,481 | B2 * | 8/2005 | Ikku et al. ........................ | 850/10 |
| 8,238,524 | B2 * | 8/2012 | Aizaki et al. .................... | 379/79 |
| 8,345,093 | B2 * | 1/2013 | Nishiwaki ....................... | 348/79 |

FOREIGN PATENT DOCUMENTS

| | | |
|---|---|---|
| CN | 2505861 | 8/2002 |
| CN | 1856028 | 11/2006 |
| JP | 10-274564 | 10/1998 |
| JP | 2004-200888 | 7/2004 |
| JP | 2009-21815 | 1/2009 |

OTHER PUBLICATIONS

Chinese Office Action issued Mar. 26, 2014 in corresponding Chinese Patent Application No. 201010576935.6.

* cited by examiner

*Primary Examiner* — Kanjibhai Patel (74) *Attorney, Agent, or Firm* — K&L Gates LLP (57) ABSTRACT

An information processing apparatus includes an acquisition section and a correction section. The acquisition section acquires information of lightness distribution of a first image captured by an imaging section capable of capturing an image of an observed area provided on an optical path of an optical system of an optical microscope, the image of the observed area being obtained by the optical microscope, the first image being an image of the observed area in a state where no sample is placed therein, the lightness distribution resulting from the optical system of the optical microscope. The correction section corrects, based on the information of lightness distribution acquired by the acquisition section, lightness unevenness of a second image captured by the imaging section, the second image being an image of the observed area in a state where the sample is placed therein.

8 Claims, 12 Drawing Sheets

FIG.14

INFORMATION PROCESSING APPARATUS, INFORMATION PROCESSING METHOD, PROGRAM, AND IMAGING APPARATUS INCLUDING OPTICAL MICROSCOPE

CROSS REFERENCES TO RELATED APPLICATIONS

The present application is a continuation of U.S. application Ser. No. 12/961,023, filed on Dec. 6, 2010, which claims priority to Japanese Priority Patent Application JP 2009-283342 filed in the Japan Patent Office on Dec. 14, 2009, the entire content of which is hereby incorporated by reference.

BACKGROUND

The present application relates to an information processing apparatus, an information processing method, a program, and an imaging apparatus including an optical microscope, which process an image signal obtained by an image sensor to thereby correct lightness distribution of an output image.

From the past, for example, a digital still camera including an image sensor such as a charge-coupled device (CCD) is widely used as an imaging device. When an image of an object is captured with such an imaging device, a shading correction technique for correcting distribution of lightness or luminance of the captured image is used in many cases.

For example, Japanese Patent Application Laid-open No. 2004-200888 (hereinafter, referred to as Patent Document 1) discloses the following shading correction technique. In the technique, first, an image of a colorless subject having a high luminance level is captured as a reference subject. Based on a distribution state of the luminance levels of video signals thus obtained, correction data corresponding to a distance from the center point of a lens or a position of the lens is created using a mathematical expression. With this correction data, the luminance level of the video signal obtained by image-capturing is corrected (see, for example, paragraph [0020] of Patent Document 1).

SUMMARY

For example, in a case where an image obtained by an optical microscope is digitized, it is difficult to predict lightness unevenness of an output image because of a complicated magnifying optical system of the microscope. Therefore, it is difficult to correct lightness unevenness with use of the correction data created by the mathematical expression as disclosed in Patent Document 1.

In view of the circumstances as described above, it is desirable to provide an information processing apparatus, an information processing method, a program, an imaging apparatus including an optical microscope that are capable of correcting lightness unevenness that is difficult to be predicted.

According to an embodiment, there is provided an information processing apparatus including an acquisition means and a correction means.

The acquisition means acquires information of lightness distribution of a first image captured by an imaging means capable of capturing an image of an observed area provided on an optical path of an optical system of an optical microscope, the image of the observed area being obtained by the optical microscope, the first image being an image of the observed area in a state where no sample is placed therein, the lightness distribution resulting from the optical system of the optical microscope.

The correction means corrects, based on the information of lightness distribution acquired by the acquisition means, lightness unevenness of a second image captured by the imaging means, the second image being an image of the observed area in a state where the sample is placed therein.

In the information processing apparatus, the information of lightness distribution resulting from the optical system of the optical microscope is acquired from the first image that is an image of the observed area in a state where no sample is placed therein. Based on the information of lightness distribution, it is possible to correct the lightness unevenness of the second image that is an image of the observed area in a state where the sample is placed therein, the lightness unevenness being difficult to be predicted.

The information processing apparatus may further include a storage means for storing the information of lightness distribution acquired by the acquisition means. In this case, the correction means may correct the lightness unevenness of the second image based on the information of lightness distribution stored by the storage means.

For example, assuming that the lightness distribution information of a predetermined observed area for which an illumination optical system or the like is determined is stored, it is unnecessary to newly acquire the lightness distribution information when a sample is placed in the observed area, and the lightness unevenness of the second image can be corrected based on the stored lightness distribution information. As a result, a processing time necessary for correcting the lightness unevenness can be shortened.

The acquisition means may acquire the information of lightness distribution for each first divided area obtained by dividing the first image into a plurality of areas. In this case, the correction means may correct the lightness unevenness of the second image for each second divided area obtained by dividing the second image into a plurality of areas, the second divided area corresponding to the first divided area.

In the information processing apparatus, the lightness distribution information is acquired for each first divided area of the first image. Then, the lightness unevenness of the second image is corrected for each second divided area of the second image that corresponds to the first divided area. As a result, a processing time necessary for correcting the lightness unevenness can be shortened.

The acquisition means may acquire information of chromaticity distribution of the first image, the chromaticity distribution resulting from the optical system of the optical microscope. In this case, the correction means may adjust a white balance of the second image based on the information of chromaticity distribution acquired by the acquisition means.

In the information processing apparatus, both the lightness distribution information and the chromaticity distribution information resulting from the optical system of the optical microscope can be acquired from the first image. As a result, the lightness unevenness of the second image can be corrected based on the lightness distribution information. In addition, the white balance of the second image can be adjusted based on the chromaticity distribution information.

According to another embodiment, there is provided an information processing method, which is executed by an information processing apparatus, as follows.

In other words, the information processing method includes: acquiring information of lightness distribution of a first image captured by an imaging means capable of capturing an image of an observed area provided on an optical path of an optical system of an optical microscope, the image of the observed area being obtained by the optical microscope, the first image being an image of the observed area in a state where no sample is placed therein, the lightness distribution resulting from the optical system of the optical microscope; and correcting, based on the acquired information of lightness distribution, lightness unevenness of a second image captured by the imaging means, the second image being an image of the observed area in a state where the sample is placed therein.

According to another embodiment, there is provided a program causing an information processing apparatus to execute the information processing method described above. The program may be recorded on a recording medium.

According to another embodiment, there is provided an imaging apparatus including an optical microscope, an imaging means, an acquisition means, and a correction means.

The optical microscope includes an optical system.

The imaging means is capable of capturing an image of an observed area provided on an optical path of the optical system, the image of the observed area being obtained by the optical microscope.

The acquisition means acquires information of lightness distribution of a first image captured by the imaging means, the first image being an image of the observed area in a state where no sample is placed therein, the lightness distribution resulting from the optical system of the optical microscope.

The correction means corrects, based on the information of lightness distribution acquired by the acquisition means, lightness unevenness of a second image captured by the imaging means, the second image being an image of the observed area in a state where the sample is placed therein.

According to another embodiment, there is provided an information processing apparatus including an acquisition section and a correction section. The acquisition section acquires information of lightness distribution of a first image captured by an imaging section capable of capturing an image of an observed area provided on an optical path of an optical system of an optical microscope, the image of the observed area being obtained by the optical microscope, the first image being an image of the observed area in a state where no sample is placed therein, the lightness distribution resulting from the optical system of the optical microscope. The correction section corrects, based on the information of lightness distribution acquired by the acquisition section, lightness unevenness of a second image captured by the imaging section, the second image being an image of the observed area in a state where the sample is placed therein.

As described above, according to an embodiment of the present application, lightness unevenness resulting from an optical system of an optical microscope, which is difficult to be predicted, can be corrected.

Additional features and advantages are described herein, and will be apparent from the following Detailed Description and the figures.

DETAILED DESCRIPTION

Embodiments of the present application will be described below in detail with reference to the drawings.

First Embodiment

Figure 1:
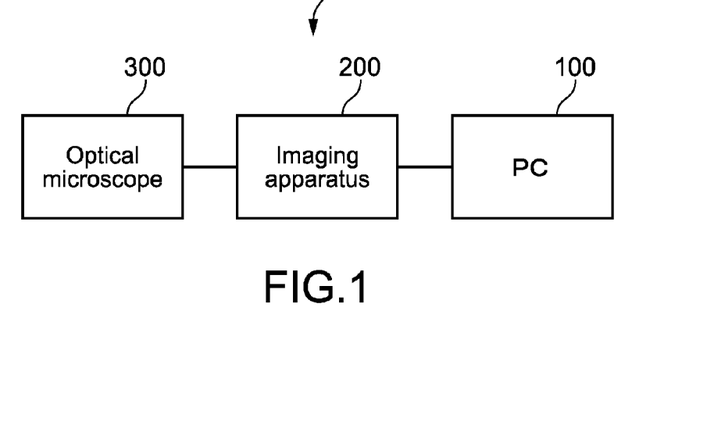
FIG. 1 is a block diagram showing a structural example of an imaging system including an information processing apparatus according to a first embodiment.
Figure 2:
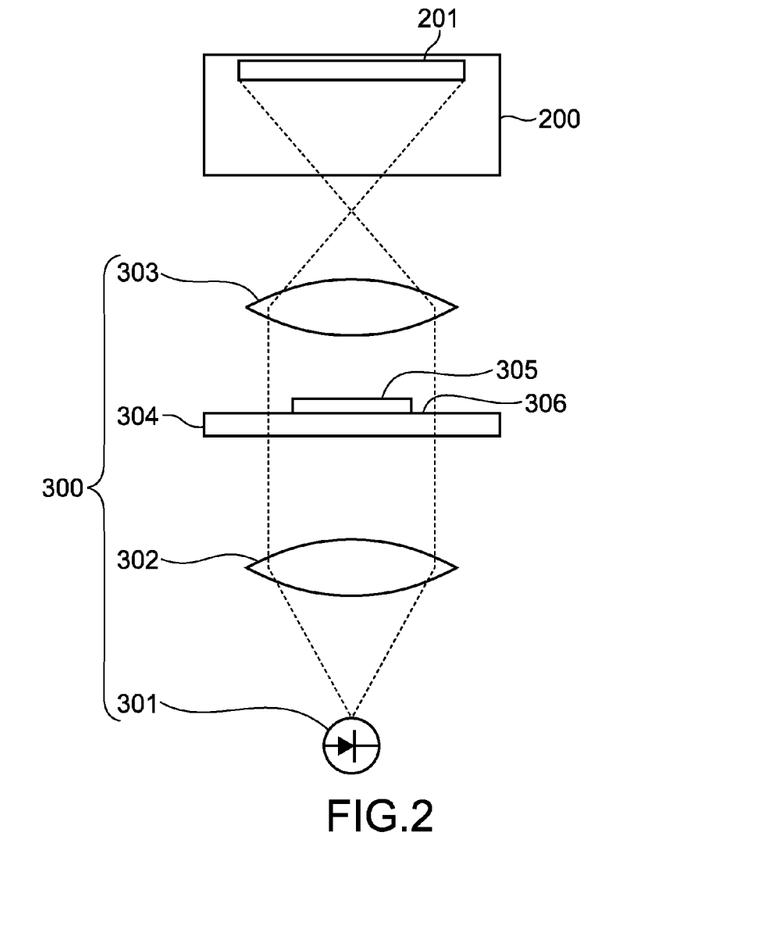
FIG. 2 is a diagram schematically showing structures of an optical microscope and an imaging apparatus shown in FIG. 1.

FIG. 1 is a block diagram showing a structural example of an imaging system including an information processing apparatus according to a first embodiment. FIG. 2 is a diagram schematically showing structures of an optical microscope and an imaging apparatus shown in FIG. 1. An imaging system 400 in FIG. 1 includes an optical microscope 300, an imaging apparatus 200 as an imaging means, and a personal computer (PC) 100 as an information processing apparatus. As the imaging apparatus 200, for example, a digital still camera is used.

The optical microscope 300 includes, for example, a light source 301 such as a light-emitting diode (LED), an illumination optical system 302, an image-forming optical system 303, and a sample stage 304 provided on an optical path of the illumination optical system 302 and image-forming optical system 303. On the sample stage 304, an observed area 306 is provided in which a sample 305 is placed, and an image of the observed area 306 is generated.

The imaging apparatus 200 includes, for example, an image sensor 201 such as a charge-coupled device (CCD), and can capture an image of the observed area 306 that is obtained by the optical microscope 300 and store the image as image data. This image data is read by the PC 100 and is output after being subjected to data processing to be described later.

Here, the imaging apparatus 200 and the PC 100 will be described in detail.

Figure 3:
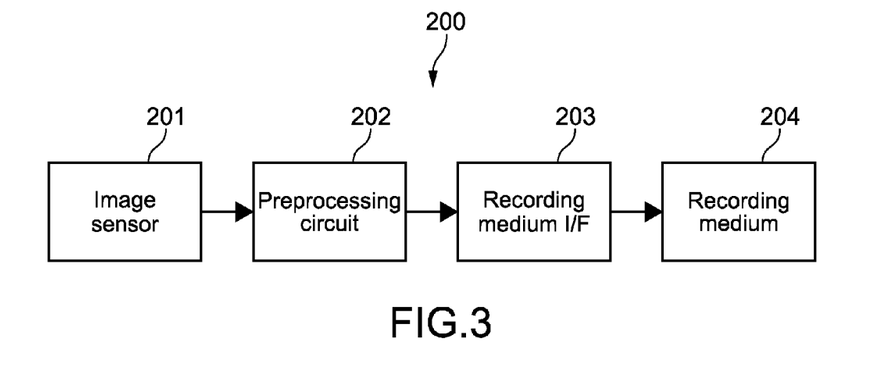
FIG. 3 is a block diagram showing a structural example of the imaging apparatus shown in FIG. 1.
Figure 4:
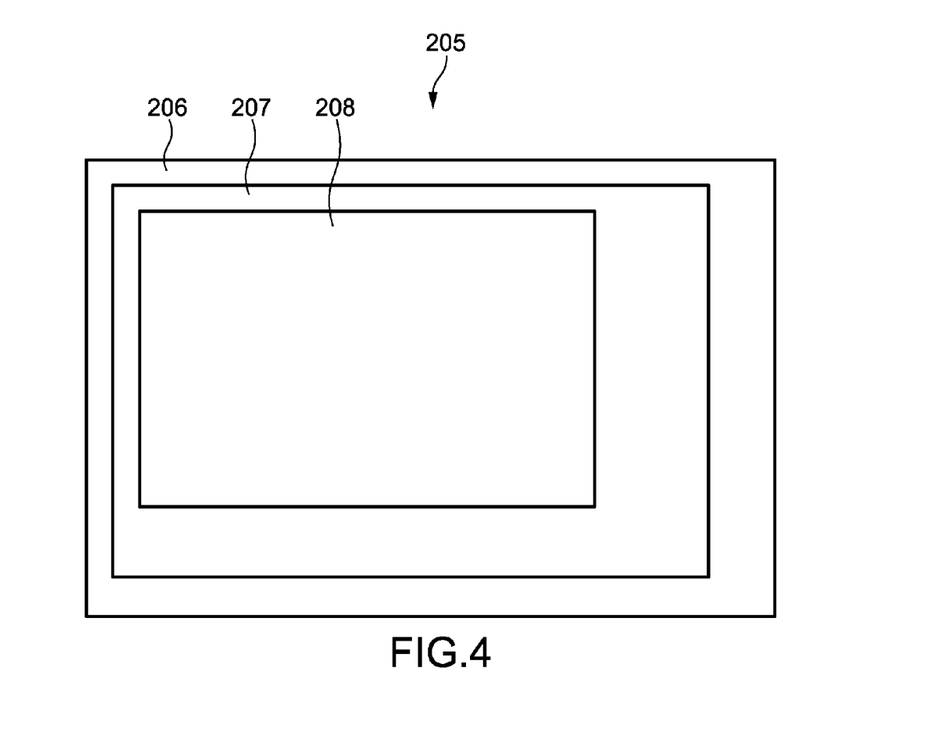
FIG. 4 is a diagram schematically showing Raw data as image data generated by the imaging apparatus shown in FIG. 3.

FIG. 3 is a block diagram showing a structural example of the imaging apparatus 200. FIG. 4 is a diagram schematically showing Raw data as image data generated by the imaging apparatus 200.

The imaging apparatus 200 includes the image sensor 201, a preprocessing circuit 202, a recording medium interface (I/F) 203, and a recording medium 204. As the recording medium 204, for example, a memory card, an optical disc, or a magnetic optical disc is used.

Incident light is collected by a lens (not shown) under predetermined imaging-capturing conditions (aperture, zoom, focus, and the like), and an optical image is formed on an imaging surface of the image sensor 201. The image sensor 201 outputs the imaged result of the optical image formed on the imaging surface to the preprocessing circuit 202. In this embodiment, a sensor in which color filters of G are arranged in checkered pattern is used as the image sensor 201, but a three-plate sensor, a black-and-white sensor, a line sensor, or a multi-sensor may be used, for example.

The preprocessing circuit 202 previously processes an output signal from the image sensor 201 and controls the recording medium I/F 203 to record a Raw data file on the recording medium 204. As shown in FIG. 4, as Raw data 205, a rectangular CCD image having an invalid pixel area 206 such as optical black (OPB), a valid pixel area 207, and an effective pixel area 208 is stored in dot sequence in the Raw data file.

[Structure of Information Processing Apparatus]

Figure 5:
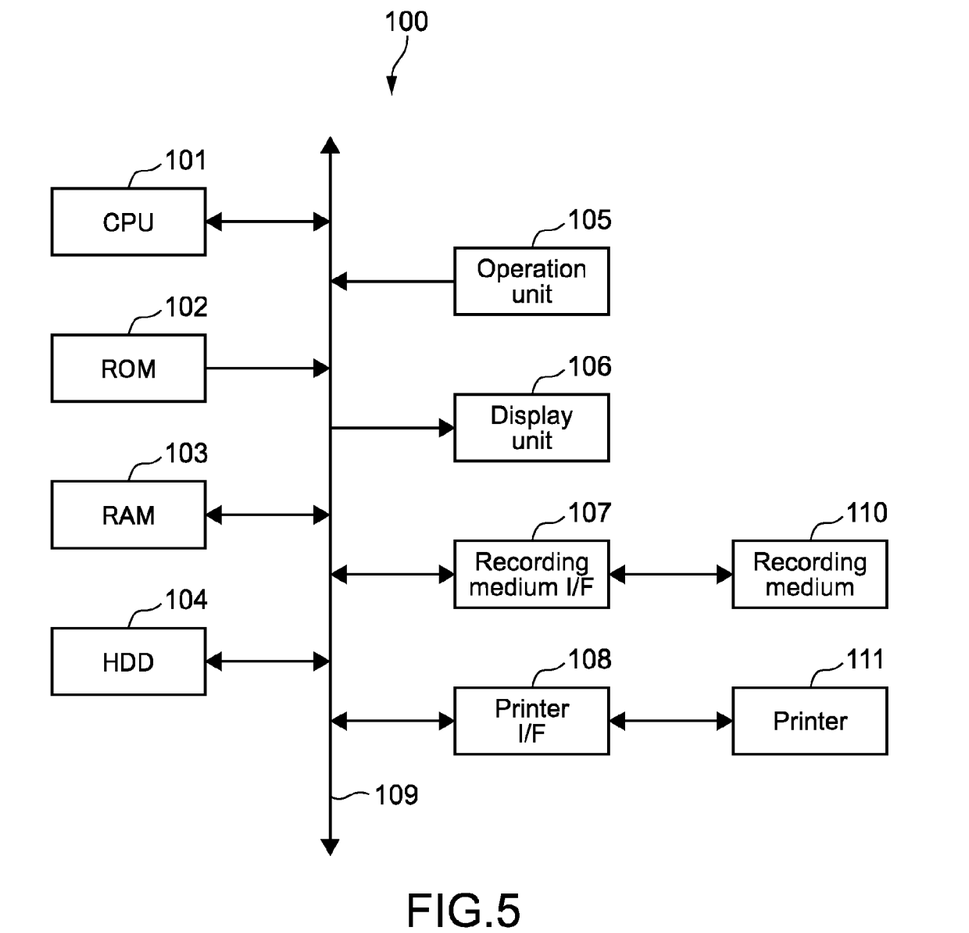
FIG. 5 is a block diagram showing a structural example of a PC shown in FIG. 1.

FIG. 5 is a block diagram showing a structural example of the PC 100. The PC 100 includes a CPU (Central Processing Unit) 101, a ROM (Read Only Memory) 102, a RAM (Random Access Memory) 103, an HDD (Hard Disk Drive) 104, an operation unit 105, a display unit 106, a recording medium interface (I/F) 107, a printer interface (I/F) 108, and a bus 109 that connects those components above to each other.

The CPU 101 reads a system program such as an operating system (OS) from the ROM 102 or the like, and executes the system program using a work area secured in the RAM 103. The CPU 101 reads an image processing program or the like from the ROM 102, the RAM 103, the HDD 104, or the like, and executes the program using the work area secured in the RAM 103, or a primary and/or secondary cache provided in the CPU 101.

The CPU 101 can perform, on the Raw data 205 described above, a series of image quality correction processing including optical correction processing, gamma correction processing, demosaic processing, noise reduction processing, and the like. Further, the CPU 101 forms recording image data by compressing luminance data and color data by a predetermined data compression system, and restores the original Raw data 205 that is not subjected to the data compression by decompressing the recording image data. Here, the CPU 101 functions as a processing execution section, a progress information management section, a resource information acquisition section, a processing-priority setting section, and a processing control section.

The ROM 102 stores programs executed by the CPU 101, various types of data necessary for processing, and the like.

The RAM 103 includes a video RAM (VRAM) for image display (not shown), and is mainly used as a work area in which various types of processing are performed.

The HDD 104 includes a hard disk, and performs data write/read with respect to the hard disk in accordance with the control of the CPU 101.

The operation unit 105 includes numeric keys, character keys, arrow keys, various function keys, and the like and supplies, to the CPU 101, an operation input from a user. The operation unit 105 may include a pointing device such as a mouse. The CPU 101 controls the respective units to perform processing corresponding to the operation input that is input by the user via the operation unit 105.

The display unit 106 includes a display device such as an LCD (Liquid Crystal Display) and a CRT (Cathode Ray Tube), and displays an image corresponding to an image signal formed based on the luminance data and color data.

The recording medium I/F 107 performs data write/read with respect to a recording medium 110 such as a memory card, an optical disc, and a magnetic optical disc. Alternatively, as the recording medium I/F 107 and the recording medium 110, an HDD including a hard disk may be used.

The printer I/F 108 outputs printing data of the image, or the like to a printer 111.

Operation of Information Processing Apparatus

Figure 6:
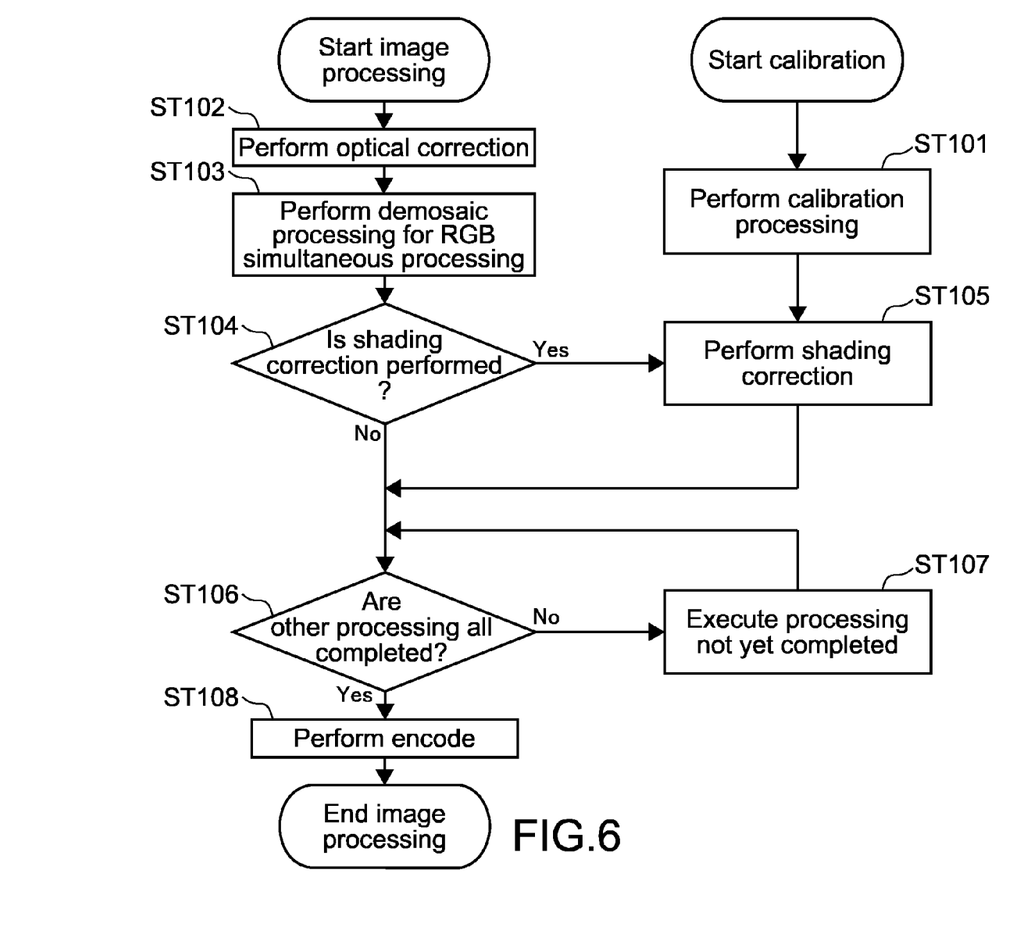
FIG. 6 is a flowchart showing processing of the PC shown in FIG. 1.

FIG. 6 is a flowchart showing the processing of the PC 100, as information processing according to this embodiment. Here, a Raw data file of a sample image as a second image is recorded in the HDD 104 of the PC 100 in a compressed state, the second image being an image of the observed area 306 on which the sample 305 is placed, which is generated by the imaging apparatus 200.

The CPU 101 of the PC 100 decompresses the Raw data file of the sample image that is recorded in the HDD 104. Then, the CPU 101 stores the Raw data 205 of the sample image stored on the Raw data file in a predetermined storage area of the RAM 103 in a decompressed state.

The CPU 101 performs calibration processing in advance in accordance with an instruction of the user or factory coordination (Step 101). The calibration processing refers to processing for creasing a correction table involving the capture of an all-white image by the imaging apparatus 200. The calibration processing will be described later in detail.

The CPU 101 performs optical correction processing on the Raw data 205 of the sample image, the optical correction processing including defect correction, RawNR (noise reduction), and the like (Step 102). Further, the CPU 101 performs demosaic processing on the Raw data 205 of the sample image (Step 103). The demosaic processing refers to processing of performing RGB simultaneous processing on the Raw data 205 of the sample image stored in dot sequence. Hereinafter, each pixel of the sample image is constituted of three values of RGB at a matched position on an image space. It should be noted that in this embodiment, the processing performed after the RGB simultaneous processing but before the shading correction, such as gamma correction processing, is also included in the demosaic processing.

The CPU 101 seeks an instruction as to whether to perform the shading correction from the user via a user interface, for example (Step 104). Upon receiving an instruction to perform the shading correction from the user, the CPU 101 performs shading correction processing based on the correction table obtained by the calibration processing in Step 101 (Step 105). The shading correction processing refers to processing for setting the pixels of the sample image to have appropriate lightness, which will be described later in detail.

The CPU 101 judges whether there is processing not yet completed, in accordance with a progress flag (Step 106). Then, if there is processing not yet completed, the CPU 101 continues the processing until the processing not yet completed does not exist (Step 107). In this embodiment, all processing performed after the shading correction is carried out in this step. The CPU 101 encodes the Raw data 205 of the processed sample image (Step 108), and then terminates the image processing.

Calibration Processing

Figure 7:
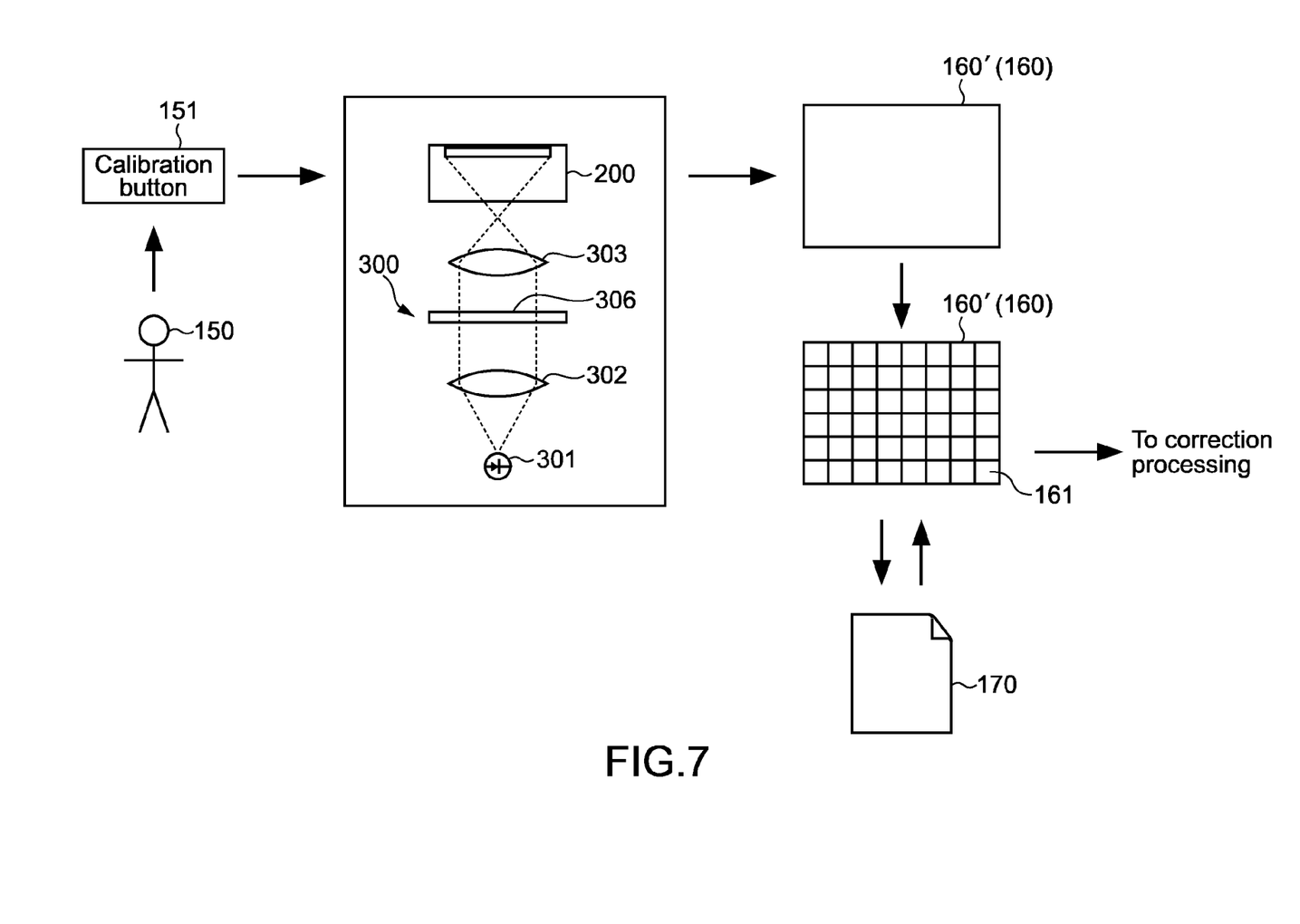
FIG. 7 is a diagram for explaining a method for calibration processing shown in FIG. 6.
Figure 8:
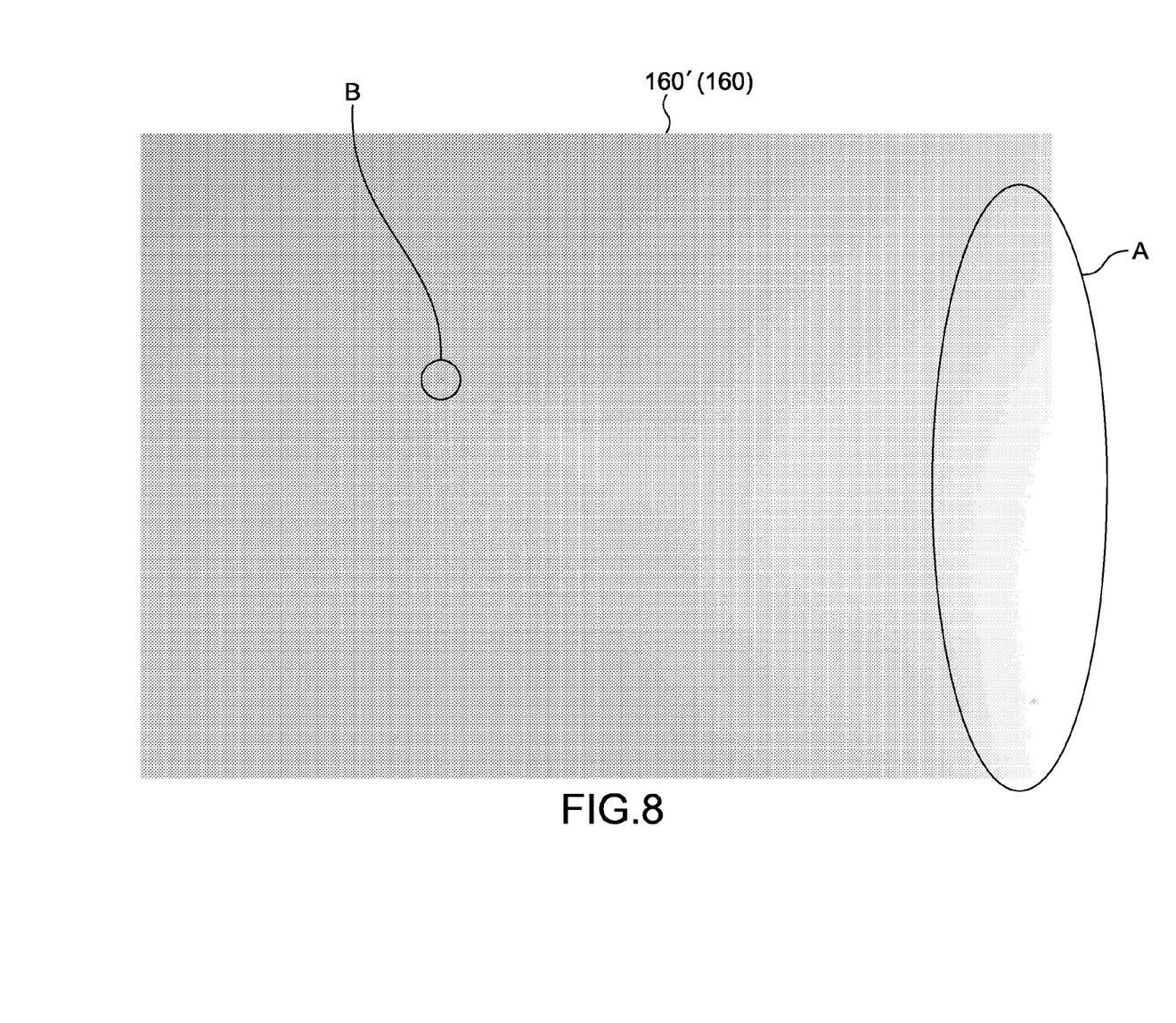
FIG. 8 is a diagram showing an example of an all-white image generated in the calibration processing shown in FIG. 7.

FIG. 7 is a diagram for explaining a method for calibration processing of Step 101 shown in FIG. 6. FIG. 8 is a diagram showing an example of an all-white image generated in the calibration processing.

For example, assuming that the user 150 inputs an instruction of the calibration processing via a calibration button 151 of the operation unit 105, the imaging apparatus 200 captures an all-white image (first image) 160 that is an image of the observed area 306 on which no sample is placed, and generates a Raw data file of the all-white image 160. The Raw data file of the all-white image 160 is compressed and recorded in the HDD 104 of the PC 100 in that state. It should be noted that the Raw data file of the all-white image 160, which is generated by the imaging apparatus 200, may be stored in the HDD 104 of the PC 100 in advance.

The CPU 101 stores the Raw data of the all-white image 160 in a decompressed state in a predetermined area of the RAM 103. Then, the optical correction processing and demosaic processing described in Steps 102 and 103 of FIG. 6 are performed on the Raw data of the all-white image 160. Thus, the all-white image 160 becomes an image on which all factors of the unevenness caused by the light source 301, the illumination optical system 302, and the image-forming optical system 303, and noises that are not completely removed by the optical correction processing in Step 102 are superimposed, in contrast to a theoretical white color.

The CPU 101 performs LPF (Low Pass Filter) processing on the pixels of the all-white image 160. The LPF processing refers to processing of smoothing the pixels of the all-white image 160 with pixels therearound. By the LPF processing, the noises that are not completely removed by the optical correction processing are removed. As a result, the all-white image 160 becomes an all-white image 160' on which all factors of the unevenness caused by the light source 301, the illumination optical system 302, and the image-forming optical system 303 are exclusively superimposed, in contrast to a theoretical white color. It should be noted that the noise removal processing for the all-white image 160 may be performed not by the LPF processing, but a median filter, pattern recognition, or an algorithm such as a learning circuit.

As shown in FIG. 8, in an end portion on the right-hand side in the all-white image 160', there is a lightness uneven area A that is brighter than other areas. Further, at the center portion of the all-white image 160', for example, there is a lightness uneven area B that is generated due to dust or the like existing on the optical path of the illumination optical system 302 or the image-forming optical system 303.

The CPU 101 divides the all-white image 160' into a plurality of first divided areas 161, and calculates representative lightness values R1, G1, B1 as lightness distribution information for each of the first divided areas 161. As the representative lightness values R1, G1, B1, for example, average luminance values of R, G, B in each of the first divided areas 161, maximum luminance values of R, G, B in each of the first divided areas 161, or the like are used. In addition, the CPU 101 calculates average values avgR, avgG, and avgB of R, G, B in the entire frame of the all-white image 160', as the lightness distribution information. Then, reciprocals KR, KG, and KB of the representative lightness values R1, G1, and B1 with respect to the average values avgR, avgG, and avgB (that is, KR=avgR/R1, KG=avgG/G1, and KB=avgB/B1) are calculated, to thereby create a correction table 170. For example, the average values avgR, avgG, and avgB are each set to 1.0, and the representative lightness values R1, G1, B1 with the set average values as references may be calculated. In this case, the correction table 170 of the representative lightness values R1, G1, B1 may be created, or those of the reciprocals KR, KG, KB may be created.

The correction table 170 is recorded in the HDD 104 or the like of the PC 100, or stored in a predetermined storage area of the RAM 103. Thus, all factors of the unevenness caused by the light source 301, the illumination optical system 302, and the image-forming optical system 303 in contrast to a theoretical white color are exclusively stored, as multipliers of R, G, B for the pixels, in the HDD 104 or the like. It should be noted that the correction tales of the representative lightness values R1, G1, B1 may be created and stored in the HDD 104 or the like.

For example, due to changes in intensity of the light source 301 of the optical microscope 300 and in structure of the optical system, secular changes, or the like, it may be necessary to update the calibration processing. Also in such a case, the calibration processing described above is performed in response to the instruction from the user 150, for example.

Shading Correction Processing

Figure 9:
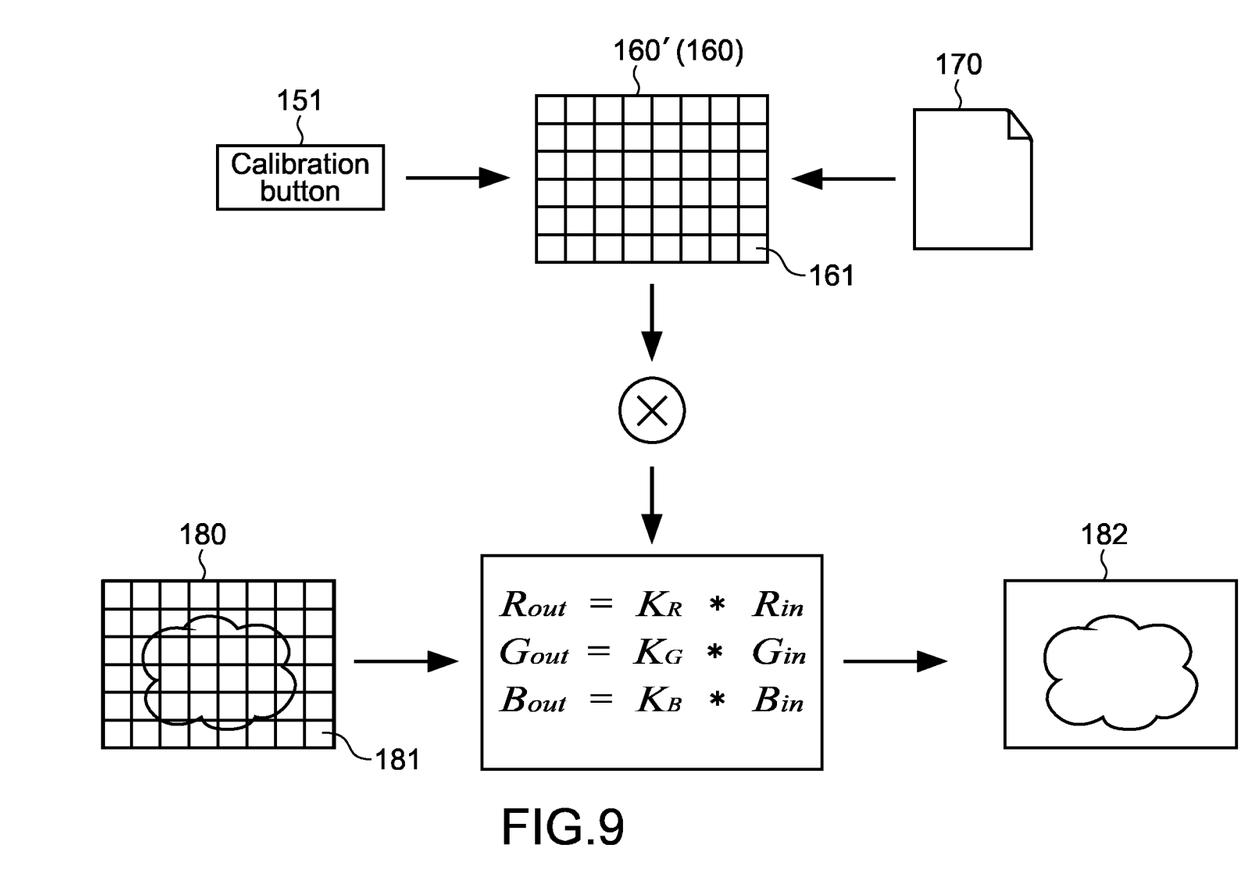
FIG. 9 is a diagram for explaining a method for shading correction processing shown in FIG. 6.
Figure 10:
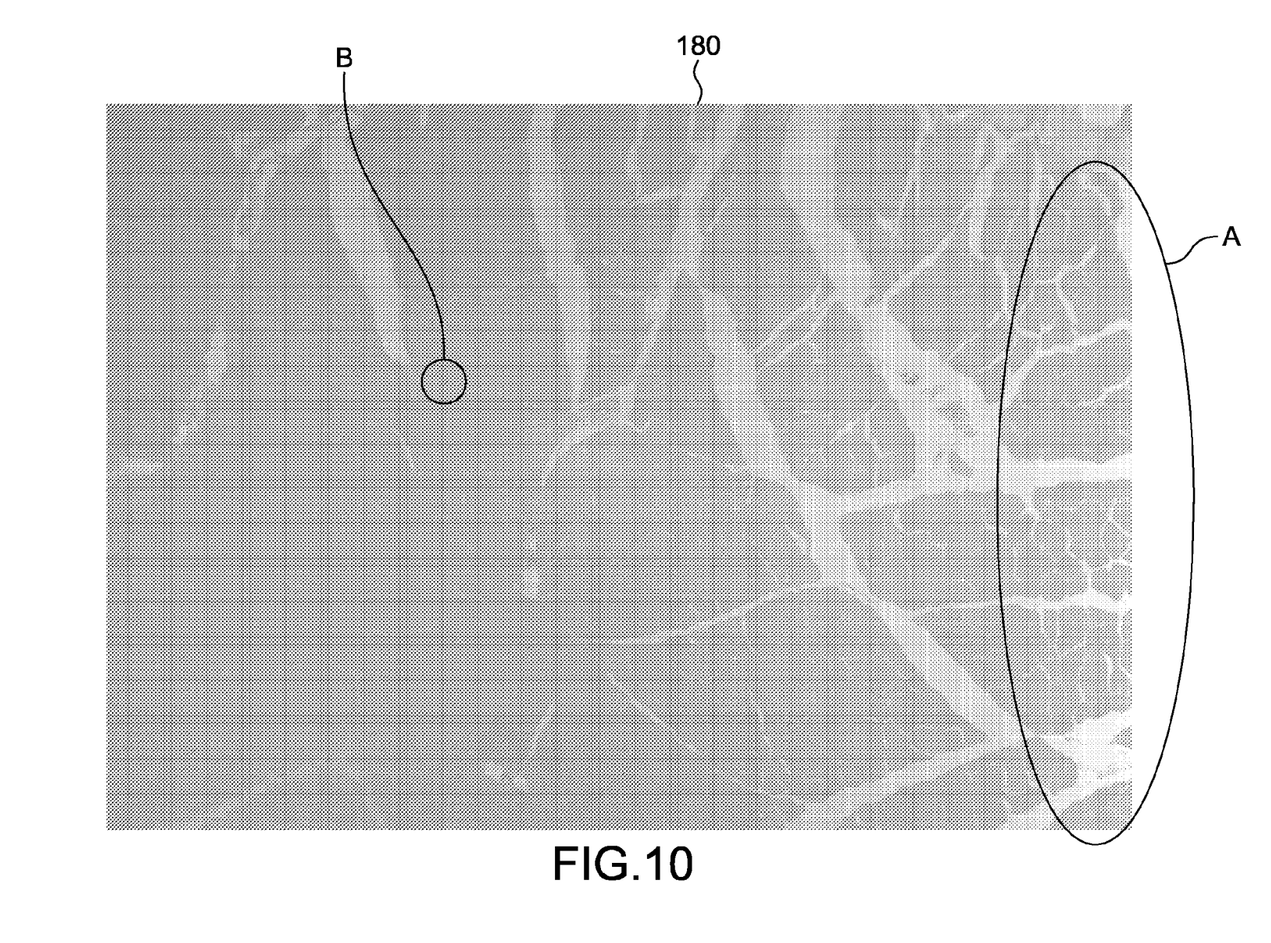
FIG. 10 is a diagram showing an example of a sample image that is not yet subjected to the shading correction shown in FIG. 9.
Figure 11:
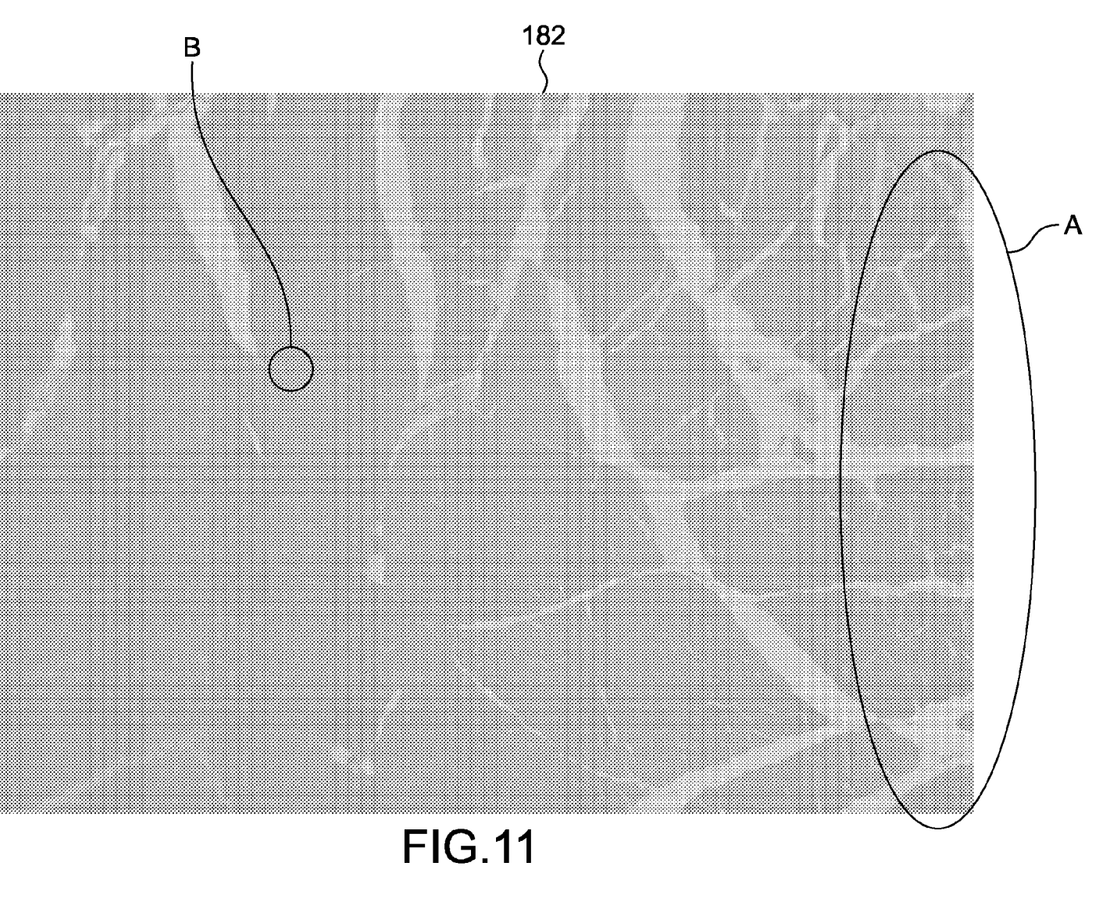
FIG. 11 is a diagram showing a sample image that has been subjected to the shading correction shown in FIG. 9.

FIG. 9 is a diagram for explaining a method for shading correction processing in Step 105 shown in FIG. 6. FIG. 10 is a diagram showing an example of a sample image 180 that is not yet subjected to the shading correction. FIG. 11 is a diagram showing a sample image 182 that has been subjected to the shading correction. As shown in FIG. 10, the sample image 180 that is not yet subjected to the shading correction includes the lightness uneven areas A and B that are generated in the all-white image 160' shown in FIG. 8.

The CPU 101 calculates, from the correction table 170 stored in the HDD 104 or the like, a multiplier for each of R, G, B that corresponds to each pixel of the sample image 180 as follows. The CPU 101 divides the sample image 180 into a plurality of second divided areas 181 that correspond to the first divided areas 161 of the all-white image 160. Then, the luminance values of R, G, B of each pixel within a second divided area 181 are multiplied by the reciprocals KR, KG, KB of the representative lightness values R1, G1, B1 of each corresponding first divided area 161. Thus, the lightness unevenness exclusively resulting from all factors of the unevenness caused by the light source 301, the illumination optical system 302, and the image-forming optical system 303 in contrast to a theoretical white color are corrected for each of the second divided areas 181 of the sample image 180.

From the sample image 182 that have been subjected to the shading correction, which is shown in FIG. 11, it is found that the lightness uneven areas A and B generated in the sample image 180 are corrected. It should be noted that in an imaging optical system with a shallow depth of field that is included in the optical microscope 300, the light from a subject is not parallel due to a radiation angle of the light from the light source 301 or an illumination diaphragm and has a certain angle, and therefore the lightness unevenness such as a colored flare and sensor shading are also caused. In addition, there may be a case where the lightness unevenness may occur due to a shutter speed of the imaging apparatus 200 or a temperature change of the light source 301. Such lightness unevenness can also be corrected by the shading correction processing described in this embodiment.

The light source 301 and the optical system of the optical microscope 300 can be managed, and certain imaging conditions can be held in time sequence or on a space. Therefore, the shading correction processing as described above can be performed based on the lightness distribution information obtained from the all-white image 160'.

As described above, in the PC 100 as the information processing apparatus according to this embodiment, the sample image 180 is subjected to the shading correction based on the representative lightness values R1, G1, B1 and the average values avgR, avgG, and avgB that serve as the lightness distribution information of the all-white image 160' captured by the imaging apparatus 200. Thus, it is possible to correct lightness unevenness resulting from the optical system or the like of the optical microscope 300, which is difficult to be predicted. As a result of this, it is possible to improve a gray scale, a resolution, a dynamic range expansion, or color reproduction, or the like of the sample image 180.

In addition, for example, assuming that the correction table 170 obtained under predetermined imaging conditions in which the light source 301, the illumination optical system 302, the image-forming optical system 303, and the like are determined is stored in the HDD 104 or the like, when the sample 305 is placed in the observed area 306, it is unnecessary to capture an all-white image 160 of the observed area 306 again and calculate the representative lightness values R1, G1, B1. In other words, it is possible to correct the lightness unevenness of the sample image 180 based on the correction table 170 stored in the HDD 104. Thus, it is possible to shorten a processing time necessary for the correction of the lightness unevenness.

The correction table 170 may be loaded in accordance with the instruction of the user 150 or may be loaded automatically. For example, in a case where the area of the sample 305 is larger than that of the observed area 306, a plurality of sample images 180 is captured. At this time, if the correction table 170 is automatically loaded each time one sample image 180 is captured, the convenience of the user 150 is enhanced. The plurality of sample images 180 is subjected to the shading correction processing described above, with the result that an image of the sample 305 that does not cause a feeling of strangeness can be obtained by bonding a plurality of sample images 182 in which lightness unevenness is corrected.

In addition, in this embodiment, the representative lightness values R1, G1, B1 are calculated for each of the first divided areas 161 of the all-white image 160', and the lightness unevenness is corrected for each second divided area 181 corresponding to the first divided area 161. Thus, for example, even in a case where the Raw data 205 having a large size of, for example, 10 MB per image is processed, the loads on the processing resources such as the CPU 101 and the RAM 103 of the PC 100 are alleviated and a processing speed can be constantly improved.

Second Embodiment

An information processing apparatus according to a second embodiment will be described. In the following description, equivalents to various apparatuses or data used in the imaging system 400 described in the first embodiment are not descried or simply described.

In the information processing apparatus (PC) of this embodiment, in addition to the shading correction processing described in the first embodiment, auto white balance (AWB) correction processing can be performed on the sample image. The auto white balance correction processing refers to processing of automatically judging an area to be white in the sample image and correcting the luminance values of R, G, B of the sample image so that the area to be white is changed to be white.

In the auto white balance correction processing that is known from the past, image data of a target image is detected. The detection refers to processing of performing metering by a metering technique that is adaptive to a subject, and calculating an appropriate white balance gain value by using a statistical technique such as a histogram. Based on the white balance gain value, a white balance of the target image is adjusted.

[Operation of Information Processing Apparatus]

Figure 12:
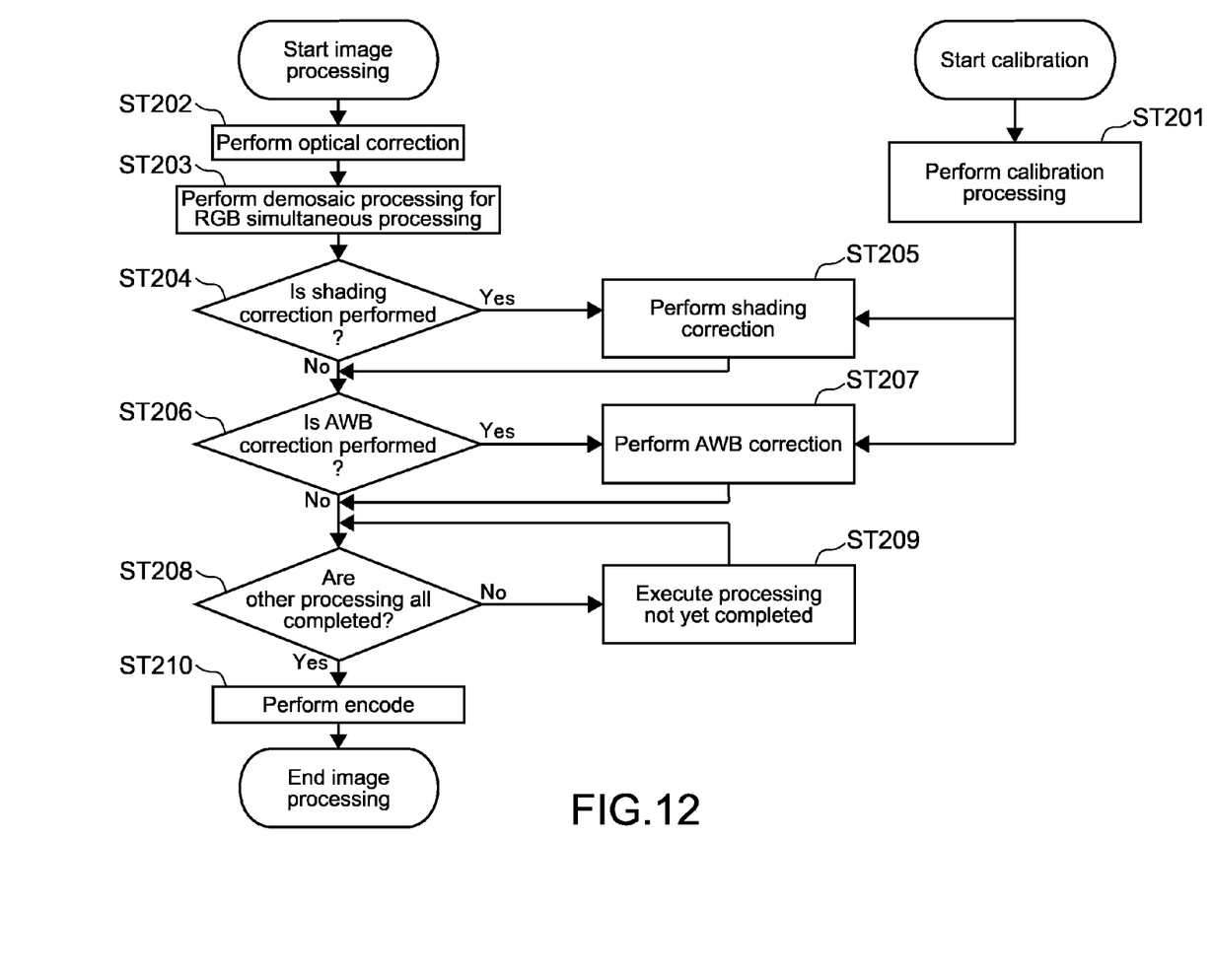
FIG. 12 is a flowchart showing processing of a PC as an information processing apparatus according to a second embodiment.
Figure 13:
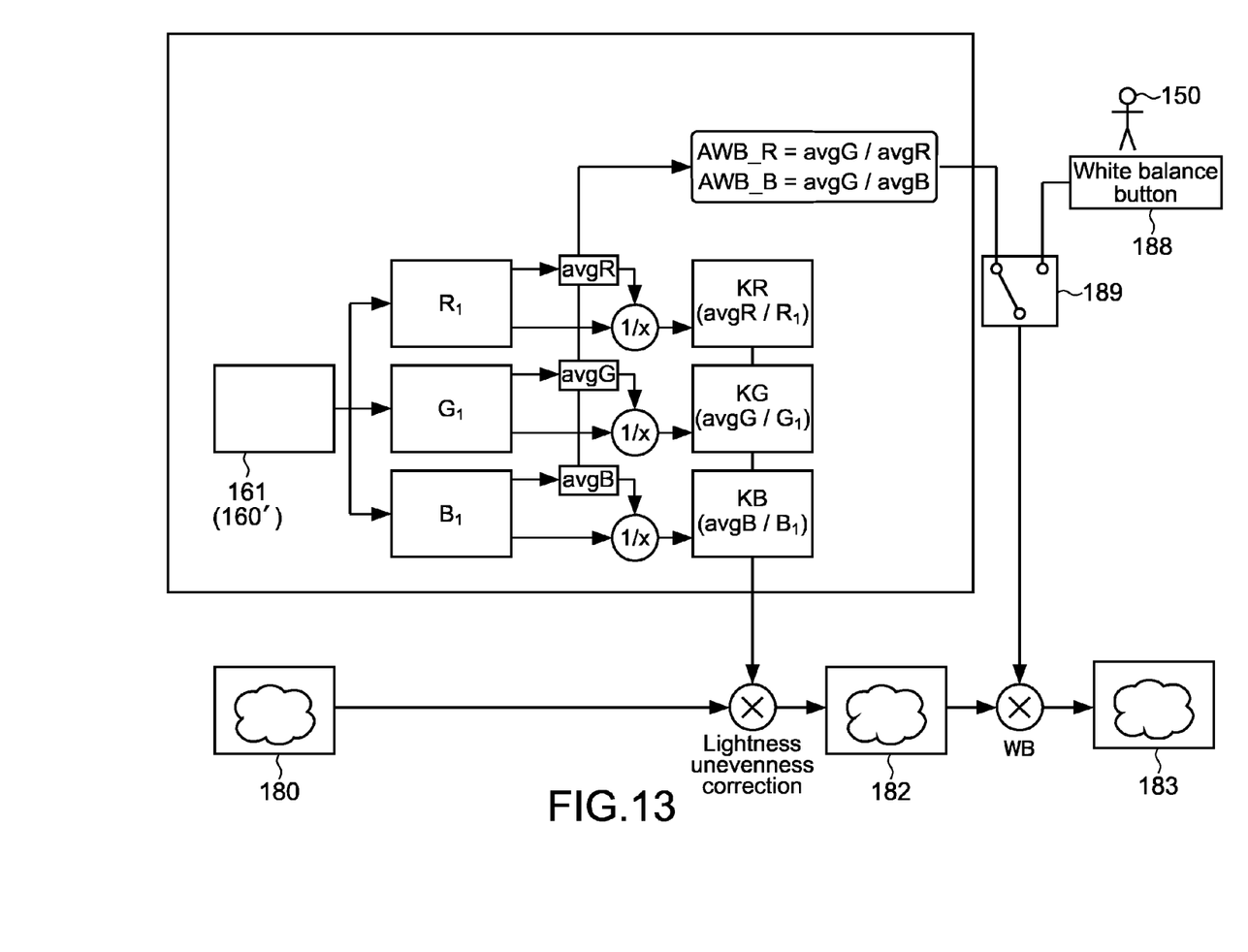
FIG. 13 is a diagram for explaining calibration processing and auto white balance correction processing performed by the PC of the second embodiment.

FIG. 12 is a flowchart showing processing of a PC as the information processing apparatus according to this embodiment. FIG. 13 is a diagram for explaining the calibration processing and the auto white balance correction processing performed by the PC of this embodiment.

Calibration Correction Processing

In Step 201 shown in FIG. 12, the calibration processing is performed as follows. First, as described in the first embodiment, the CPU of the PC calculates representative lightness values R1, G1, B1 as lightness distribution information for each of the first divided areas 161 of the all-white image 160. In addition, the CPU calculates average values avgR, avgG, and avgB of R, G, B in the entire frame of the all-white image 160, as lightness distribution information. Then, reciprocals KR, KG, and KB of the representative lightness values R1, G1, and B1 with respect to the average values avgR, avgG, and avgB (that is, KR=avgR/R1, KG=avgG/G1, and KB=avgB/B1) are calculated, to thereby create a correction table.

Then, the CPU calculates multipliers AWB_R and AWB_B for the auto white balance correction. Those multipliers AWB_R and AWB_B are represented by the following expressions.

$AWB\_R=avgG/avgR$ $AWB\_B=avgG/avgB$

In other words, the CPU utilizes the average values avgR, avgG, and avgB calculated for the shading correction processing as chromaticity distribution information for the auto white balance correction processing. Thus, a memory usage and a processing time can be reduced.

The CPU creates a correction table of the calculated multipliers AWB_R and AWB_B. Alternatively, AWB_R and AWB_B may be appropriately calculated based on the correction table of the reciprocals KR, KG, KB when needed.

The operation performed from Step 202 to Step 204 is the same as that from Step 102 to Step 104 of the flowchart shown in FIG. 6, and therefore description thereof will be omitted.

In Step 205, the reciprocals KR, KG, KB calculated in the calibration processing described above are used for performing shading correction processing on the sample image 180. Thus, a sample image 182 in which lightness unevenness is corrected is created.

The CPU of the PC seeks an instruction as to whether to perform the auto white balance correction via a user interface, for example (Step 206). Upon receiving an instruction to perform the auto white balance correction, the CPU performs auto white balance correction processing as follows, based on the correction table calculated by the calibration processing in Step 201 (Step 207).

Auto White Balance Correction Processing

The CPU multiplies a luminance value of R of each pixel of the sample image 182 by AWB_R, and multiplies a luminance value of B of each pixel by AWB_B. Thus, a sample image 183 in which a white balance is adjusted is created. The multipliers AWB_R and AWB_B contain all spectral characteristics of the light source, the illumination optical system, and the image-forming optical system in contrast to a theoretical white color. Therefore, the sample image 183 becomes an image in which all spectral characteristics of the light source, the illumination optical system, and the image-forming optical system are corrected so that a theoretical white becomes white.

Heretofore, in the PC according to this embodiment, both the lightness distribution information for shading correction processing and the chromaticity distribution information for auto white balance correction processing are acquired from the all-white image 160 captured by the imaging apparatus. Thus, it is possible to acquire the chromaticity distribution information in the calibration processing in Step 201 shown in FIG. 12. Further, it becomes unnecessary to detect Raw data of the sample image 182 as in the case of the past. Accordingly, a memory usage and a processing time can be largely reduced.

It should be noted that in this embodiment, one of the auto white balance correction processing described above and white balance correction processing set by the user 150 can be selected by the user 150. Alternatively, preset white balance correction processing may be selected. As shown in FIG. 13, the user 150 appropriately sets the white balance correction processing via, for example, a white balance button 188 of the operation unit. Alternatively, one of the white balance correction processing that are described above is selected. With a switching block 189, the white balance correction processing performed on the sample image 182 is switched in accordance with the instruction of the user 150.

The information processing apparatus according to each of the embodiments described above is used in a system that digitizes an image of a cell, a tissue, an organ, or the like of a living body, which is captured by the optical microscope, in the field of medicine or pathology, for example, to examine the tissue or the like by a doctor or a pathologist or diagnose a patient based on the digitized image. However, the information processing apparatus may be applicable to other fields in addition to this field.

Other Embodiments

Embodiments according to the present application are not limited to the embodiments described above, and other various embodiments may be possible.

In the embodiments described above, the PC is exemplified as the information processing apparatus. However, for example, by the imaging apparatus 200 shown in FIG. 1, part or all of the calibration processing, the shading correction processing, or the auto white balance correction processing may be performed. In this case, the imaging apparatus 200 and the PC 100 are used as the information processing apparatus according to an embodiment. Further, for example, a scanner apparatus having a function of an optical microscope may be used as an imaging apparatus including an optical microscope according to an embodiment, the imaging apparatus having the functions of the optical microscope 300, the imaging apparatus 200, and the PC 100 shown in FIG. 1.

Figure 14:
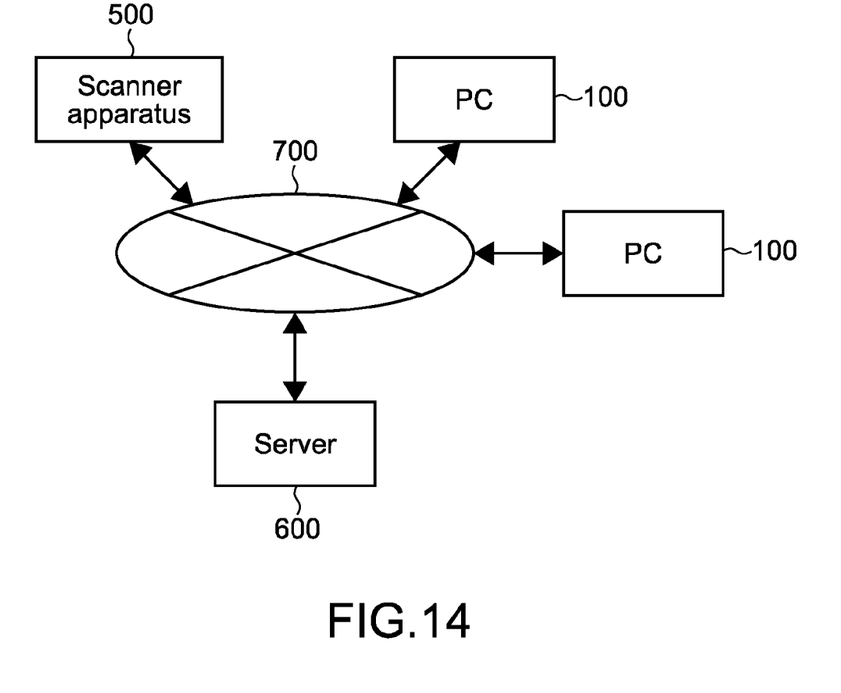
FIG. 14 is a diagram showing a structural example of an imaging system according to other embodiments.

In addition, as shown in FIG. 14, the Raw data of the all-white image or sample image generated by a scanner apparatus 500 used as an embodiment may be stored in a computer different from the PC 100 or the server 600, and the PC 100 that the user uses as a terminal apparatus may receive that Raw data by accessing those different computer and server 600. In this case, the PC 100 and the server 600 serving as terminal apparatuses may be connected via a network 700 such as LAN (Local Area Network) and WAN (Wide Area Network). Particularly, the telepathology or remote diagnosis can be realized with use of WAN.

In the description above, the Raw data file containing the Raw data of the all-white image and the sample image is created by the imaging apparatus 200 shown in FIG. 3. However, the Raw data may be subjected to image processing by the imaging apparatus 200, or a Raw data file containing various types of data such as information that identifies the imaging apparatus 200 and information that specifies image-capturing conditions may be created. Further, those various types of data may be used in the calibration correction processing, the shading correction processing, or the auto white balance correction processing.

In the description above, as shown in FIG. 9, the all-white image 160 is divided into the plurality of first divided areas 161, and the representative lightness values R1, G1, B1 are calculated for each of the first divided areas 161. However, the all-white image 160 may not be divided into a plurality of areas and the luminance values of R, G, B for each pixel of the all-white image 160 may be calculated. Then, using the calculated luminance values of each pixel, the shading correction processing or the like may be performed for each pixel of the sample image 180.

In the description above, the calibration processing is performed in advance. However, part or all of the calibration processing may be performed simultaneously with the shading correction processing or the auto white balance correction processing.

In the description above, the calibration processing, the shading correction processing, and the auto white balance correction processing are performed after the optical correction processing and the demosaic processing. However, part or all of the calibration processing, the shading correction processing, or the auto white balance correction processing may be performed before the optical correction processing and the demosaic processing.

In the description above, the values of the correction table created in the calibration processing are multipliers with respect to an ideal white color for each pixel of the all-white image. However, the values may be differences with respect to the ideal white color for each pixel. Further, the values may be first-order approximation or second-order approximation with respect to the ideal white color for each pixel.

In the description above, the representative lightness values R1, G1, B1 and the average values avgR, avgG, and avgB are calculated as the lightness distribution information of the all-white image, and the average values avgR, avgG, and avgB are utilized as the chromaticity distribution information, though not limited thereto. The information related to lightness, luminance, chromaticity, color difference, or the like obtained from the Raw data of the all-white image may be used as the lightness distribution information and the chromaticity distribution information. In addition, the correction table created in the calibration processing is not limited to the correction table of the reciprocals KR, KG, KB of the representative lightness values R1, G1, B1 with respect to the average values avgR, avgG, and avgB. For example, a correction table of RGrGbB corresponding to a color filter of the image sensor may be created.

Further, a correction table may be created in the calibration processing each time a Z position, an imaging position with respect to an observed area, an illumination optical system, an image-forming optical system, a sample, a sensor, an imaging apparatus, an image processing method, temperature, a field stop, an exposure time, an analog gain setting value, an exposure correction setting value, a chroma setting value, a magnification setting value, or the like is changed.

Further, the Raw data of each image, the correction table, or the sample image that has been subjected to the shading correction processing described above may be used for obtaining statistical data used at a time of the calibration processing, the shading correction processing, or the auto white balance correction processing.

In the description above, the image of an observed area of the optical microscope in which no sample is placed is described as an all-white image. However, the color of illumination light emitted from the optical system of the optical microscope is not limited to white. For example, 80% of illumination light may be gray. In addition, an all-white image may be captured so that ideal shading characteristics are obtained.

It should be understood that various changes and modifications to the presently preferred embodiments described herein will be apparent to those skilled in the art. Such changes and modifications can be made without departing from the spirit and scope and without diminishing its intended The application is claimed as follows:

1. An information processing apparatus, comprising:
   an acquisition section configured to acquire information of a lightness distribution of a first image captured by an image sensor, wherein the first image is obtained by a microscopy device, wherein the first image is an image of no sample, and wherein the lightness distribution results from an optical system of the microscopy device; and
   a correction section configured to correct, based on the information of lightness distribution acquired by the acquisition section, a lightness unevenness of a second image captured by the image sensor, wherein the second image is an image of the sample.

2. The information processing apparatus according to claim 1, further comprising
   a storage section configured to store the information of lightness distribution acquired by the acquisition section,
   wherein the correction section is configured to correct the lightness unevenness of the second image based on the information of lightness distribution stored by the storage section.

3. The information processing apparatus according to claim 1,
   wherein the acquisition section is configured to acquire the information of lightness distribution for each first divided area obtained by dividing the first image into a plurality of areas, and
   wherein the correction section is configured to correct the lightness unevenness of the second image for each second divided area obtained by dividing the second image into a plurality of areas, the second divided area corresponding to the first divided area.

4. The information processing apparatus according to claim 1,
   wherein the acquisition section is configured to acquire information of chromaticity distribution of the first image, the chromaticity distribution resulting from the optical system of the microscopy device,
   wherein the correction section is configured to adjust a white balance of the second image based on the information of chromaticity distribution acquired by the acquisition section.

5. An information processing method, which is executed by an information processing apparatus, the information processing method comprising:
   acquiring information of lightness distribution of a first image captured by an image sensor, wherein the first image is obtained by a microscopy device, wherein the first image is an image of no sample, and wherein the lightness distribution results from an optical system of the microscopy device; and
   correcting, based on the acquired information of lightness distribution, lightness unevenness of a second image captured by the image sensor, wherein the second image is an image of the sample.

6. A non-transitory computer readable medium storing a computer program causing an information processing apparatus to execute:
   acquiring information of lightness distribution of a first image captured by an image sensor, wherein the first image is obtained by a microscopy device, wherein the first image is an image of no sample, and wherein the lightness distribution results from an optical system of the microscopy device; and
   correcting, based on the acquired information of lightness distribution, lightness unevenness of a second image captured by the image sensor, the second image being an image of the sample.

7. An imaging apparatus, comprising:
   a microscopy device including an optical system;
   an image sensor;
   an acquisition section configured to acquire information of a lightness distribution of a first image captured by the image sensor, wherein the first image is obtained by a microscopy device, wherein the first image being an image of no sample, and wherein the lightness distribution results from the optical system of the microscopy device; and
   a correction section configured to correct, based on the information of lightness distribution acquired by the acquisition section, a lightness unevenness of a second image captured by the imaging means, the second image being an image of the sample.

8. The information processing apparatus according to claim 1, wherein the first image is obtained by capturing an all-white image.

* * * * *